(12) United States Patent
Weisbrod

(10) Patent No.: US 10,059,361 B2
(45) Date of Patent: Aug. 28, 2018

(54) ADAPTABLE LOAD MOVEMENT AND STABILIZING APPARATUS

(71) Applicant: Spa Sled Mover, LLC, Nixa, MO (US)

(72) Inventor: Steven Weisbrod, Nixa, MO (US)

( * ) Notice: Subject to any disclaimer, the term of this patent is extended or adjusted under 35 U.S.C. 154(b) by 0 days.

(21) Appl. No.: 15/347,540

(22) Filed: Nov. 9, 2016

(65) Prior Publication Data

US 2018/0127016 A1     May 10, 2018

(51) Int. Cl.
| | |
|---|---|
| *B63B 15/00* | (2006.01) |
| *B62B 15/00* | (2006.01) |
| *B65D 19/44* | (2006.01) |
| *B65D 19/00* | (2006.01) |
| *B62B 17/00* | (2006.01) |

(52) U.S. Cl.
CPC ............ *B62B 15/00* (2013.01); *B62B 17/00* (2013.01); *B65D 19/0081* (2013.01); *B65D 19/44* (2013.01); *B62B 2203/00* (2013.01); *B65D 2519/00034* (2013.01); *B65D 2519/00069* (2013.01); *B65D 2519/00293* (2013.01); *B65D 2519/00318* (2013.01); *B65D 2519/00343* (2013.01); *B65D 2519/00567* (2013.01); *B65D 2519/00815* (2013.01)

(58) Field of Classification Search
CPC ..................................................... B65D 19/44
USPC ........................... 108/55.1, 55.3, 55.5, 51.11
See application file for complete search history.

(56) References Cited

U.S. PATENT DOCUMENTS

| | | | | |
|---|---|---|---|---|
| 3,650,224 A | * | 3/1972 | Petix ................. | B65D 19/0075 108/54.1 |
| 3,949,929 A | * | 4/1976 | Kupersmit ............ | B65D 19/20 108/55.1 |
| 4,013,020 A | * | 3/1977 | Schoeller ............... | B65D 19/44 108/55.3 |
| RE29,192 E | * | 4/1977 | Anderson .............. | B65D 19/36 108/51.3 |
| 4,042,107 A | * | 8/1977 | Kendig .................. | B65D 19/44 108/53.3 |
| 4,283,068 A | | 8/1981 | Keyser | |
| 4,405,673 A | | 9/1983 | Fridley et al. | |
| 4,694,962 A | * | 9/1987 | Taub .................. | B65D 19/0073 108/185 |
| 4,717,025 A | * | 1/1988 | Maurer ................. | B65D 19/20 108/51.3 |
| 5,081,740 A | | 1/1992 | Smith | |

(Continued)

FOREIGN PATENT DOCUMENTS

| | | |
|---|---|---|
| CA | 2485729 A1 | 4/2005 |
| WO | 9308105 A1 | 4/1993 |

OTHER PUBLICATIONS

"ezmoves Pro Pull Slides," https://ezmoves.com/product/ezmovespullslidescopy/, accessed Jul. 2016.

(Continued)

*Primary Examiner* — Jose V Chen
(74) *Attorney, Agent, or Firm* — Shook, Hardy & Bacon L.L.P.

(57) ABSTRACT

Aspects hereof relate to apparatuses for moving materials and objects, such as furniture, spas, hot tubs, and the like. The apparatuses described herein may include configurable stabilizing elements that are adaptable to a surface or shape of the item being moved in order stabilize and secure the object during transport.

17 Claims, 8 Drawing Sheets

(56) References Cited

U.S. PATENT DOCUMENTS

| | | | | |
|---|---|---|---|---|
| 5,413,054 A | * | 5/1995 | Collins | B65D 19/44 108/55.3 |
| 5,426,818 A | | 6/1995 | Bushey | |
| 5,676,063 A | * | 10/1997 | Wallace | B65D 19/0093 108/55.3 |
| 5,899,337 A | * | 5/1999 | Thebeault | B65D 19/0097 206/600 |
| 5,911,179 A | * | 6/1999 | Spiczka | B65D 19/0095 108/51.11 |
| 5,984,360 A | | 11/1999 | Edwards et al. | |
| 6,112,672 A | * | 9/2000 | Heil | B65D 19/0026 108/54.1 |
| 6,186,078 B1 | * | 2/2001 | Brown | B65D 19/0014 108/55.1 |
| 6,206,424 B1 | | 3/2001 | Edwards et al. | |
| 6,234,087 B1 | * | 5/2001 | Brown | B65D 19/0034 108/55.1 |
| 6,464,256 B1 | | 10/2002 | Edwards | |
| 6,550,741 B1 | * | 4/2003 | Cottone | B60P 7/12 108/51.11 |
| 6,926,293 B1 | | 8/2005 | Pope | |
| D513,381 S | | 1/2006 | Belec | |
| 6,981,294 B2 | | 1/2006 | Edwards | |
| 7,547,024 B1 | | 6/2009 | Dell | |
| 7,555,879 B1 | * | 7/2009 | Utz | B65D 19/0095 108/56.3 |
| D601,007 S | | 9/2009 | Brouard | |
| 7,793,828 B2 | * | 9/2010 | Booth | G07F 19/20 108/55.3 |
| 7,918,165 B2 | * | 4/2011 | Owen | B65D 19/385 108/55.1 |
| 8,146,515 B2 | * | 4/2012 | Trickett | B65D 19/36 108/51.11 |
| 8,321,994 B2 | | 12/2012 | Edwards | |
| 8,596,207 B2 | * | 12/2013 | Dubois | B65D 19/0002 108/53.1 |
| 8,635,742 B2 | | 1/2014 | Smith et al. | |
| 8,671,849 B2 | * | 3/2014 | Krieg | D06F 39/001 108/51.11 |
| 9,049,932 B2 | | 6/2015 | Satur | |
| 9,283,980 B2 | | 3/2016 | Rogier | |
| 2003/0042727 A1 | | 3/2003 | Khubani | |
| 2003/0137142 A1 | | 7/2003 | Edwards | |
| 2005/0263998 A1 | | 12/2005 | Edwards | |
| 2006/0055130 A1 | | 3/2006 | Williams | |
| 2008/0000397 A1 | * | 1/2008 | Dickinson | B65D 19/20 108/55.3 |
| 2010/0078429 A1 | * | 4/2010 | Strang | B65D 90/004 220/1.5 |
| 2015/0298854 A1 | * | 10/2015 | Linares | B65D 19/0018 108/11 |
| 2016/0137344 A1 | * | 5/2016 | Tamura | B65D 19/02 198/860.3 |
| 2017/0253374 A1 | * | 9/2017 | Tunks | B65D 19/38 |

OTHER PUBLICATIONS

"Home: Spa Sled," spa-mover.com, accessed Jul. 2016.
"EZ Moves 4' Professional Carpet Slides with Pull Straps," http://www.tileprotection.com:80/product.php? productid=1227 &cat=281&page=1, accessed Jul. 2016.
"SuperSliders: Slide Furniture Effortlessly," https://web.archive.org/web/20140926075226/http://waxman.com/brands/supersliders.html, Sep. 26, 2014.

* cited by examiner

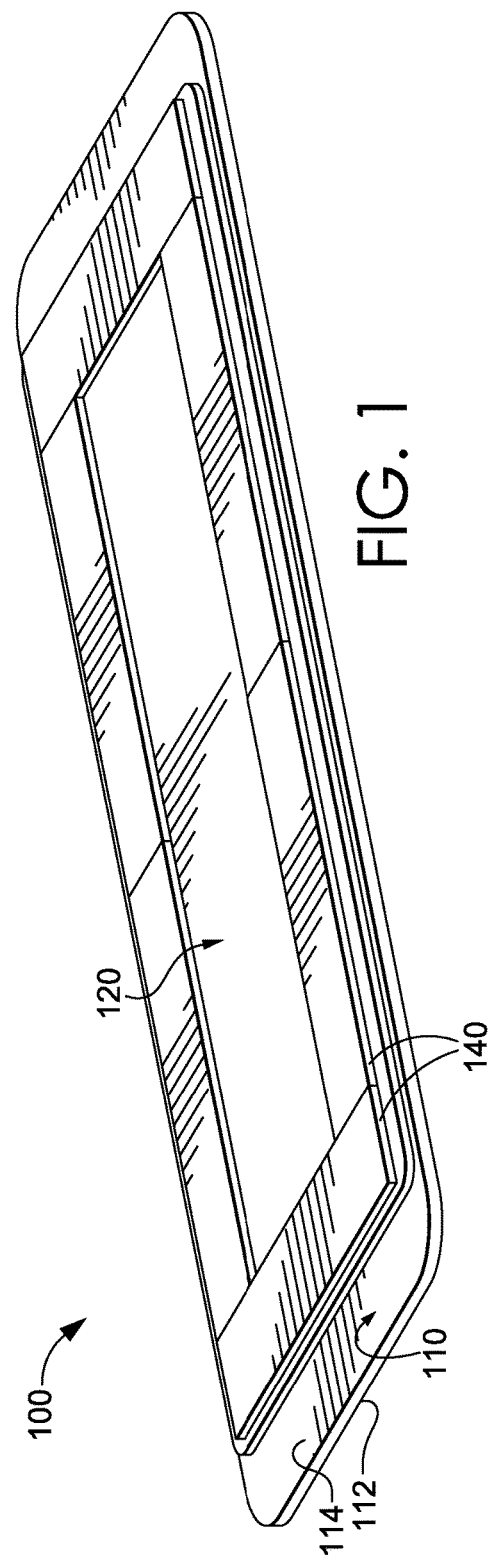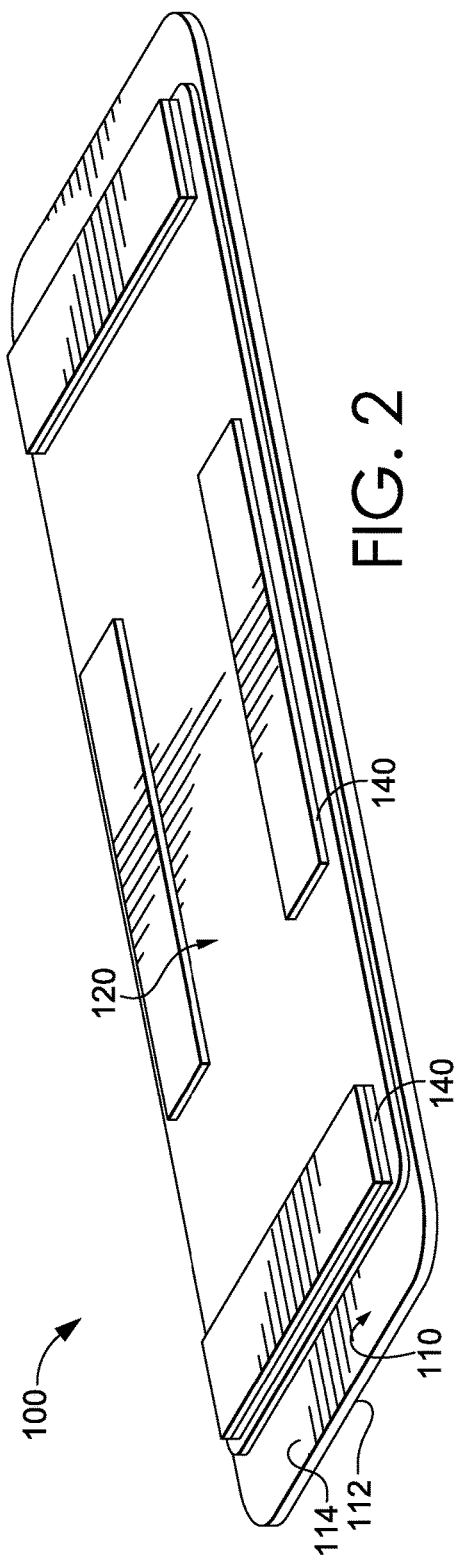

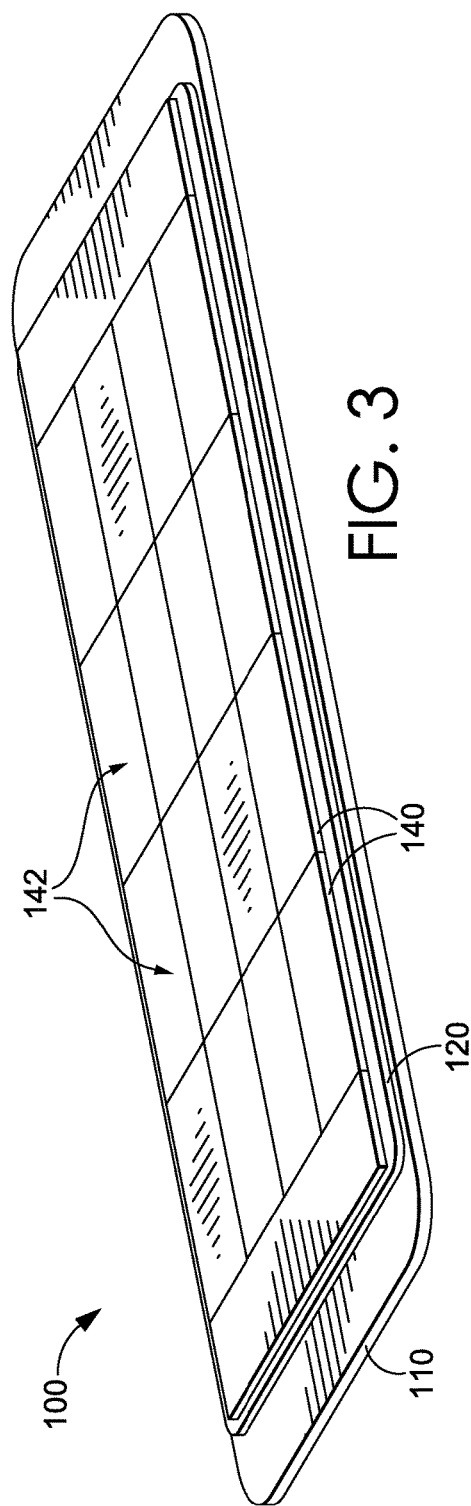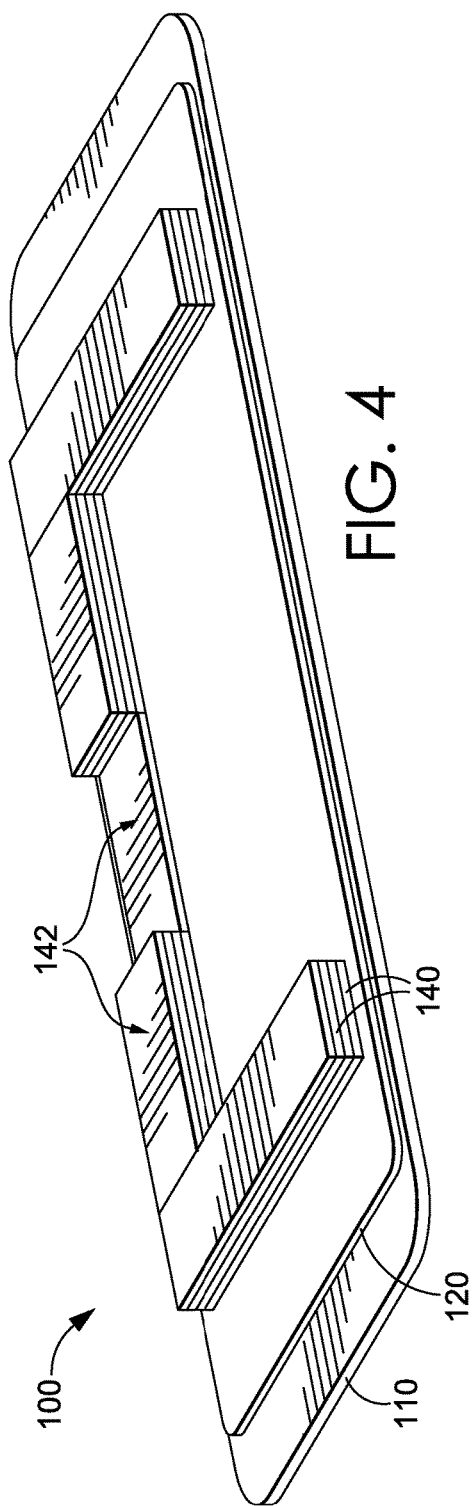

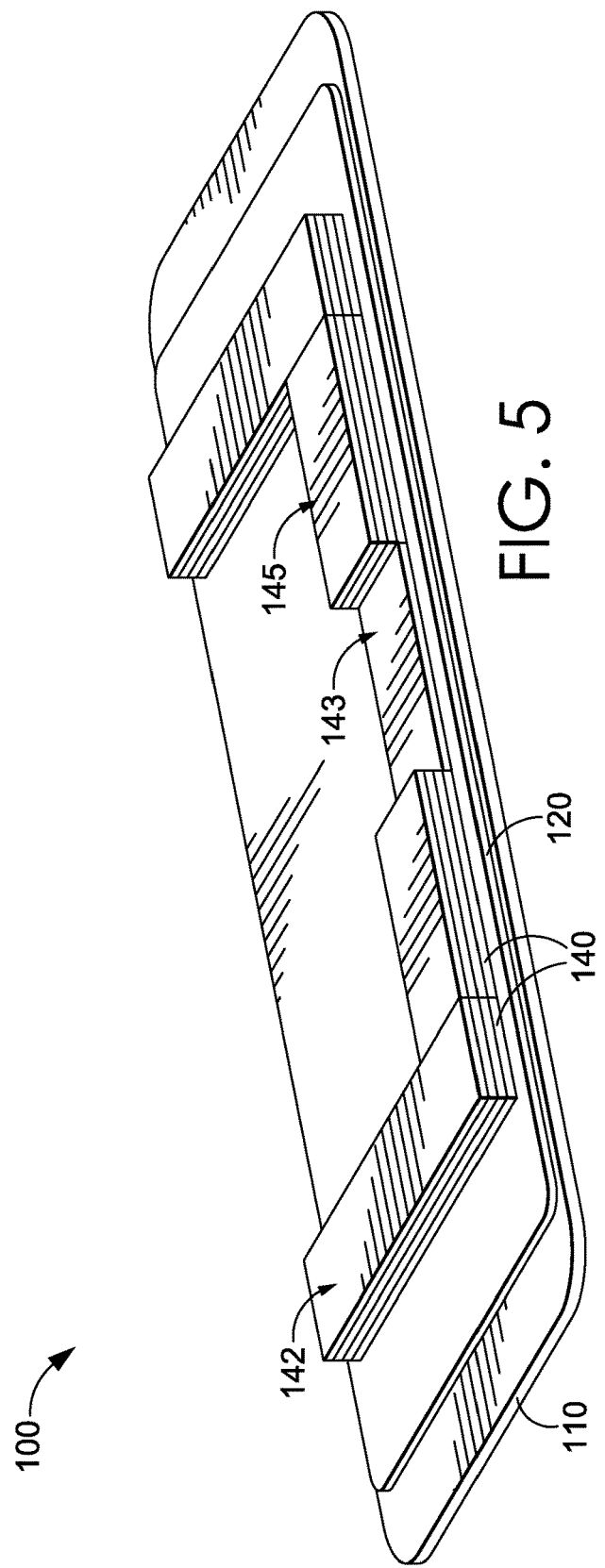

ADAPTABLE LOAD MOVEMENT AND STABILIZING APPARATUS

FIELD

Aspects of this disclosure relate to an apparatus for moving and stabilizing loads. More particularly, aspects herein relate to a sled having one or more adaptable load-stabilizing elements for securing and/or stabilizing objects during transport.

BACKGROUND

Traditionally, mechanisms for manually moving objects have lacked adequate means for stabilizing the object during transport. For example, traditional moving apparatuses often include a flat surface on which the object is placed for transport. As a result, when such apparatuses traverse uneven terrain, the object may tilt or lean according to a slope of the terrain. As such, the object may become unstable, making transport difficult or precarious.

SUMMARY

Aspects provided herein relate to apparatuses for moving materials and objects, such as furniture, spas, hot tubs, and the like. The apparatuses herein include configurable stabilizing elements that are adaptable to a surface or shape of the item being moved, in order to stabilize and secure the object during transport. For example, in one aspect, a sled for moving and stabilizing loads is provided. The sled may include a base element having a generally planar shape, a primary load-engaging surface that is affixed to a top portion of the base element, and one or more adaptable load-stabilizing elements, which are adjustably coupled to the primary load-engaging surface. The one or more adaptable load-stabilizing elements may be positioned on the surface of the primary load-engaging surface at virtually any location in order to form a secondary load-engaging surface. Accordingly, the secondary load-engaging surface may be configured to provide a substantially level engagement with a surface of the item being transported.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 1 depicts a perspective view of a sled having adaptable load-stabilizing elements, in accordance with aspects hereof;

FIG. 2 depicts a perspective view of the sled of FIG. 1, with an exemplary configuration of the adaptable load-stabilizing elements, in accordance with aspects hereof;

FIG. 3 depicts a perspective view of an exemplary sled having adaptable load-stabilizing elements that form a secondary load-engaging surface, in accordance with aspects hereof;

FIG. 4 depicts a perspective view of the sled of FIG. 3, with an exemplary configuration of the secondary load-engaging surface, in accordance with aspects hereof;

FIG. 5 depicts a perspective view of the sled of FIG. 4, opposite the view depicted in FIG. 4, of the secondary load-engaging surface, in accordance with aspects hereof;

DETAILED DESCRIPTION

Figure 6:
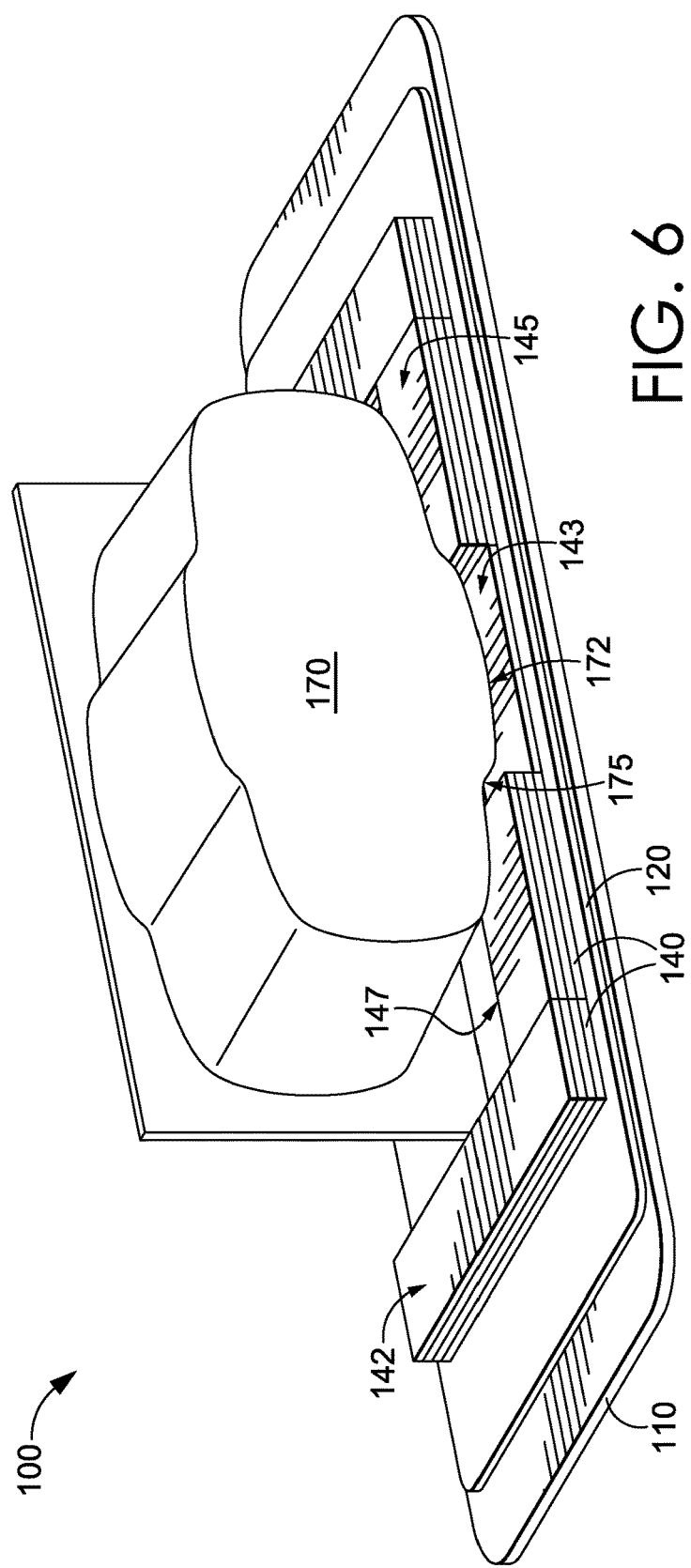
FIG. 6 depicts a perspective view of the sled of FIG. 5, with the item in a transport position, in accordance with aspects hereof.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other present or future technologies. Further, it should be appreciated that the figures do not necessarily represent an all-inclusive representation of the embodiments herein and may have various components hidden to aid in the written description thereof.

FIG. 1 depicts a first exemplary aspect of a load moving and stabilizing apparatus, or sled 100. The sled 100 may include a base element 110 that contacts the ground or other substrate, a primary load-engaging surface 120, and a plurality of adaptable load-stabilizing elements 140 for stabilizing a load placed on the sled 100 for transport.

In some aspects, the base element 110 may have a generally rectangular and planar shape, as shown in FIG. 1. However, it should be appreciated that the base element 110 (and the sled 100, as a whole), may have any number of suitable shapes and sizes. For example, the sled 100 may be configured to fit through standard doorways in order to move items in and out of a house, apartment, or other dwelling. In another example, the sled may be configured to fit within a cargo area of a box truck, a commercial van, or any other vehicle that is suitable for transporting items.

The base element 110 may be formed from a material having a low coefficient of friction (in a non-limiting example, the material may have a static coefficient of friction 0.04-0.40 µs), and that is highly resistant to abrasion. Further, the material used to form the base element 110 may be flexible enough to conform (at least in part) to a topography of a surface over which the sled 100 is traveling, yet resilient enough to handle forces required to move substantial loads. Further, the base element 110 includes a base element bottom surface 112 (which may also be referred to as a ground-engaging surface) that is smooth or flat, in order to minimize friction with the ground or other substrate during use. Accordingly, the sled 100 is usable on a variety of substrates, such as grass, gravel, concrete, paver stones, wood, carpet, wood floors, tile floors, and stairs, among others. Further, the sled 100 may be used on substrate having a variety of contours, such as uneven and variable outdoor terrain. In some exemplary aspects, the material used to form the base element 110 may be a high-density polymer, a high-density polyethylene, an ultra-high-molecular-weight polyethylene, a medium-density polyethylene, nylon, polytetrafluoroethylene, or other suitable material.

A base element top surface 114 is also provided opposite the base element bottom surface 112. The primary load-engaging surface 120 may be affixed or coupled to the base element top surface 114. The primary load-engaging surface 120 may be compressible such that it conforms to contours of the load, and provides a dampening effect. Further, the primary load-engaging surface 120 is made from a material that exhibits adhesive frictional characteristics, and, as a result, prevents sliding or displacement of the load during transport. Accordingly, the primary load-engaging surface 120 may be made from any suitable material, for example, polyethylene foam or cell sponge rubber (closed or open), among others.

The adaptable load-stabilizing elements 140 are adjustably coupled to the primary load-engaging surface 120. In one exemplary aspect, the adaptable load-stabilizing elements 140 may be provided with sizes and shapes that correspond to a perimeter of the primary load-engaging surface 120. However, as will be described in more detail below, the adaptable load-stabilizing elements 140 may be provided in a variety of shapes, sizes, and numbers. Further, the adaptable load-stabilizing elements 140 may be coupled to the primary load-engaging surface 120 via static friction created therebetween. For example, the adaptable load-stabilizing elements 140 and the primary load-engaging surface 120 may comprise cohesive materials, such that the adaptable load-stabilizing elements 140 stay in place when placed in contact with the primary load-engaging surface 120.

In some aspects, the adaptable load-stabilizing elements 140 may be formed from the same material as the primary load-engaging surface 120. However, in other aspects, the adaptable load-stabilizing elements 140 may be made from a different material than the primary load-engaging surface 120. For example, the adaptable load-stabilizing elements 140 may be made from a material that is less rigid than the material used to form the primary load-engaging surface 120 in order to provide enhanced adaptability about the contours of the load.

Turning now to FIG. 2, the adaptable load-stabilizing elements 140 may be moved to any desired location of the primary load-engaging surface 120 to enhance the stability of the load. Further, the adaptable load-stabilizing elements 140 may be configured for adjustable coupling with one another, for example via cohesion, such that the adaptable load-stabilizing elements 140 are stackable. Accordingly, the adaptable load-stabilizing elements 140 may be positioned at any desired location. For example, the adaptable load-stabilizing elements 140 shown in FIG. 2 provide a simplified exemplary configuration of the adaptable load-stabilizing elements 140 proximate the perimeter of the primary load-engaging surface 120.

FIG. 3 depicts another exemplary aspect of the sled 100. In this aspect, the adaptable load-stabilizing elements 140 may be configured such that when the adaptable load-stabilizing elements 140 are coupled directly to the primary load-engaging surface 120, they form a substantially flat surface. As a result, when the sled is not in use, or when a load has a flat surface, the adaptable load-stabilizing elements 140 may be organized to lie flat against the primary load-engaging surface 120. However, it should be appreciated that the adaptable load-stabilizing elements 140 may be any suitable size or shape. For example, the sled may include a single load-stabilizing element coupled to the primary load-engaging surface 120.

Further, the adaptable load-stabilizing elements 140 may collectively form a secondary load-engaging surface 142. In some aspects, the secondary load-engaging surface 142 may act as the sole surface with which the load comes in contact. For example, when a fragile object is being transported, it may be desirable as to configure the adaptable load-stabilizing elements 140 in a manner that provides separation between the object and the primary load-engaging surface 120. However, providing the adaptable load-stabilizing elements 140 as modular and movable components allows for a secondary load-engaging surface 142 that is configurable to a shape of the load that is being transported.

Turning now to FIG. 4, a secondary load-engaging surface 142 that has been configured to match the shape of a load is depicted. In this exemplary configuration, the secondary load-engaging surface 142 is configured to support a load with an irregular surface. As further shown in FIG. 5, the secondary load-engaging surface 142 may be configured to have a recess 143 for receiving a convex protrusion 172 of the load (such as a hot tub 170). Further, the secondary load-engaging surface 142 may be configured with protrusions 145 at locations that correspond to incurvate surfaces 175 (tapers away or curves in from the convex protrusion 172) of the hot tub 170. As can be appreciated, the configuration of the secondary load-engaging surface 142 may be modified by stacking the adaptable load-stabilizing elements 140 in a manner that provides a mating engagement with the surface of the load.

Continuing, FIG. 6 depicts the hot tub 170 on top of the sled 100 for transport, with the secondary load-engaging surface 142 configured as described above. As a result, the hot tub 170 may be stabilized for transport, for example, by configuring the secondary load-engaging surface 142 to provide a substantially level engagement with the hot tub 170. Further, the secondary load-engaging surface 142 may be configured to provide a longitudinal boundary 147, for example, at opposite ends of the hot tub 170, which may reduce or prevent sliding of the load during transport. As a result, the adaptable load-stabilizing elements 140 may be configured to provide a secondary load-engaging surface 142 that allows for substantially level orientation of the load.

Figure 7:
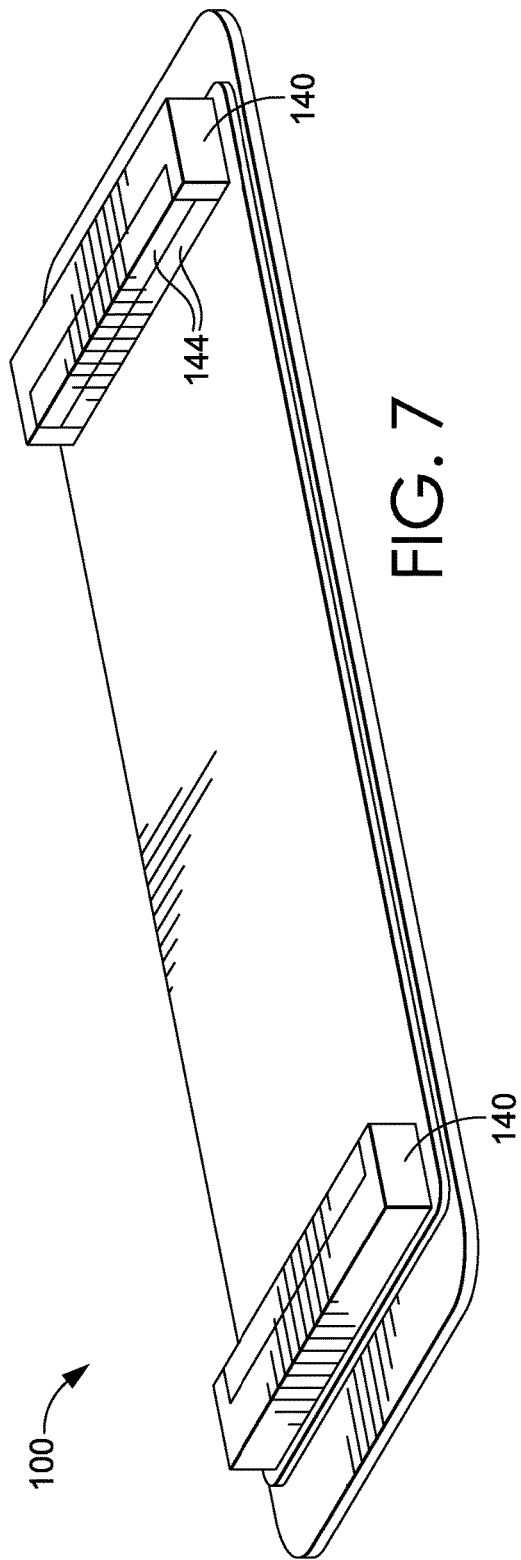
FIG. 7 depicts a perspective view of another exemplary sled having adaptable load-stabilizing elements, in accordance with aspects hereof.
Figure 8:
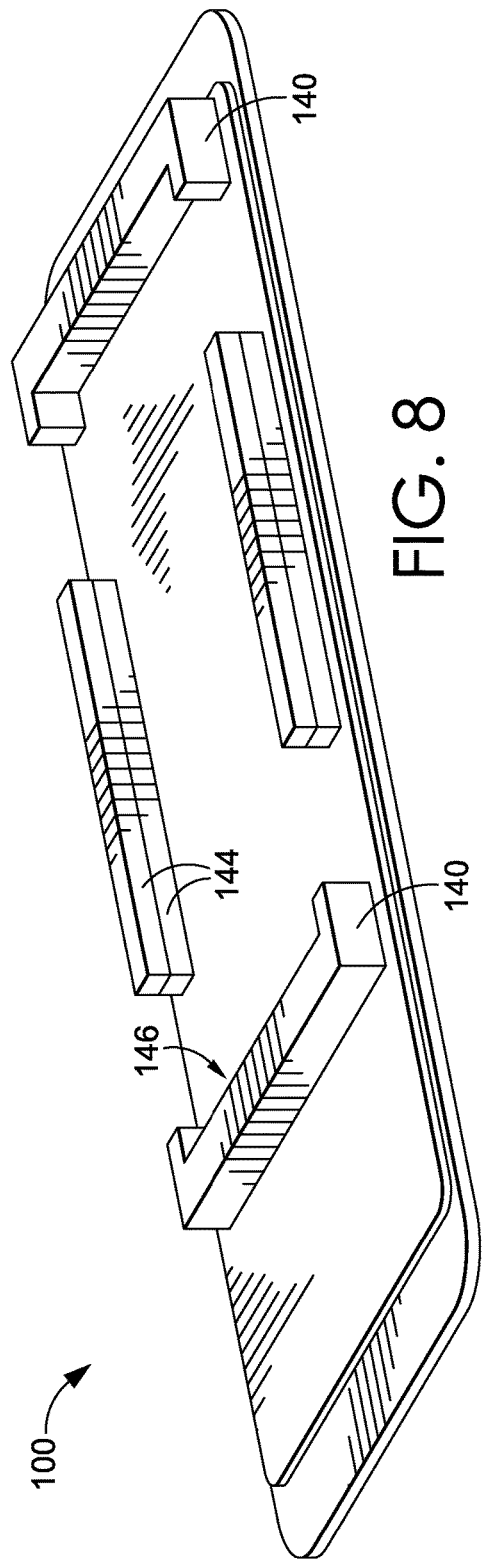
FIG. 8 depicts a perspective view of the sled of FIG. 7, with an exemplary configuration of the adaptable load-stabilizing elements, in accordance with aspects hereof.

In yet another aspect, as shown in FIGS. 7 and 8, the sled 100 may include one or more adjustable load-securing elements 144 and one or more adaptable load-stabilizing elements 140. In one exemplary aspect, the adjustable load-securing elements 144 may be C-shaped or U-shaped, and include a void 146. Additionally, the adaptable load-stabilizing elements 140 may be sized to fit within the void 146, for example, for storage when the sled 100 is not in use. The adjustable load-securing elements 144 may be placed in contact with the primary load-engaging surface 120, for example to provide a longitudinal restraint for the load.

Further, the adaptable load-stabilizing elements 140 may provide a lateral restraint for the load. As can be appreciated, the relative orientation (e.g., longitudinal and lateral) of the adjustable load-securing elements 144 and the adaptable load-stabilizing elements 140 may be modified. In one exemplary aspect, the sled 100 depicted in FIG. 8 may be configured to provide a boundary by creating a perimeter with the adjustable load-securing elements 144 and/or the adaptable load-stabilizing elements 140. Accordingly, the sled may be adapted to transport loose loads, such as gravel, paver stones, bags of landscaping materials, and the like.

Figure 9:
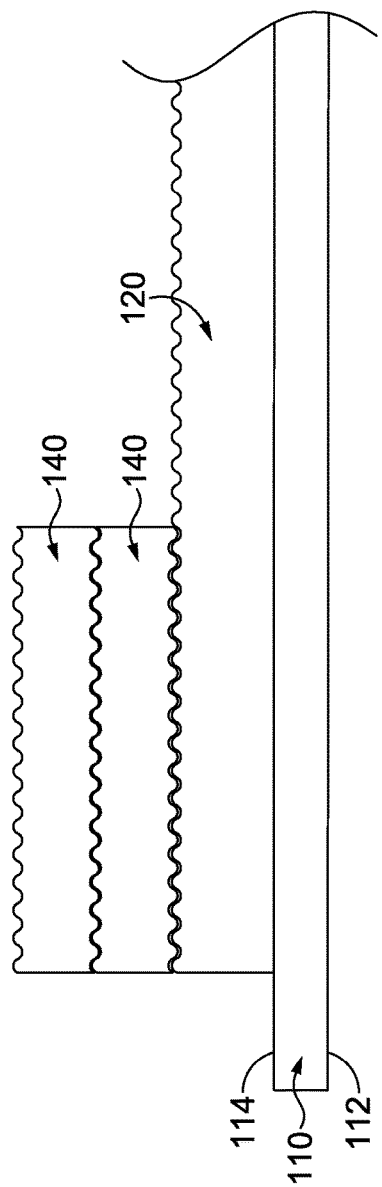
FIG. 9 depicts a close-up view of an exemplary primary load-engaging surface cohesively coupled with exemplary adaptable load-stabilizing elements, in accordance with aspects hereof.

As mentioned hereinabove, and shown in FIG. 9, the adaptable load-stabilizing elements 140 and the primary load-engaging surface 120 may be made from a cohesive material. Said another way, the means for fastening the primary load-engaging surface 120 and the adaptable load-stabilizing elements 140 may be integral to the materials from which they are formed. Accordingly, an outer surface of each of the adaptable load-stabilizing elements 140 and the primary load-engaging surface 120 may have a roughness amplitude that creates adhesive friction therebetween.

Figure 10:
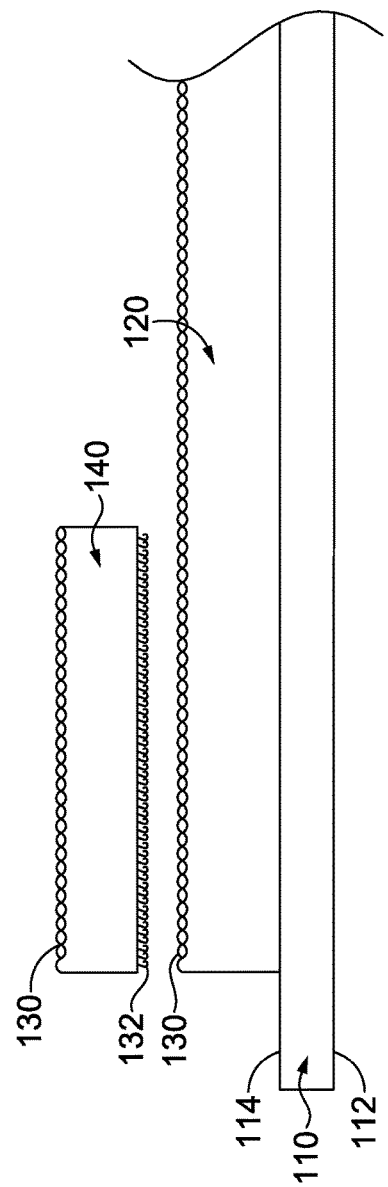
FIG. 10 depicts a close-up view of an exemplary primary load-engaging surface and exemplary adaptable load-stabilizing elements, each having exemplary fastening mechanisms thereon, in accordance with aspects hereof.

Turning now to FIG. 10, the primary load-engaging surface 120 may include one or more fastening mechanisms, such as loops 130, configured to mate with one or more complementary fastening mechanisms, such as hooks 132, of the adaptable load-stabilizing elements 140. Further, the adaptable load-stabilizing elements 140 may include loops 130 opposite the hooks 132, such that the adaptable load-stabilizing elements 140 may be coupled with one another to modify the configuration of the adaptable load-stabilizing elements 140. It should be appreciated that the hook and loop type fasteners depicted in FIG. 10 are exemplary only, and any other suitable means of fastening is considered within the scope of this disclosure.

Figure 11:
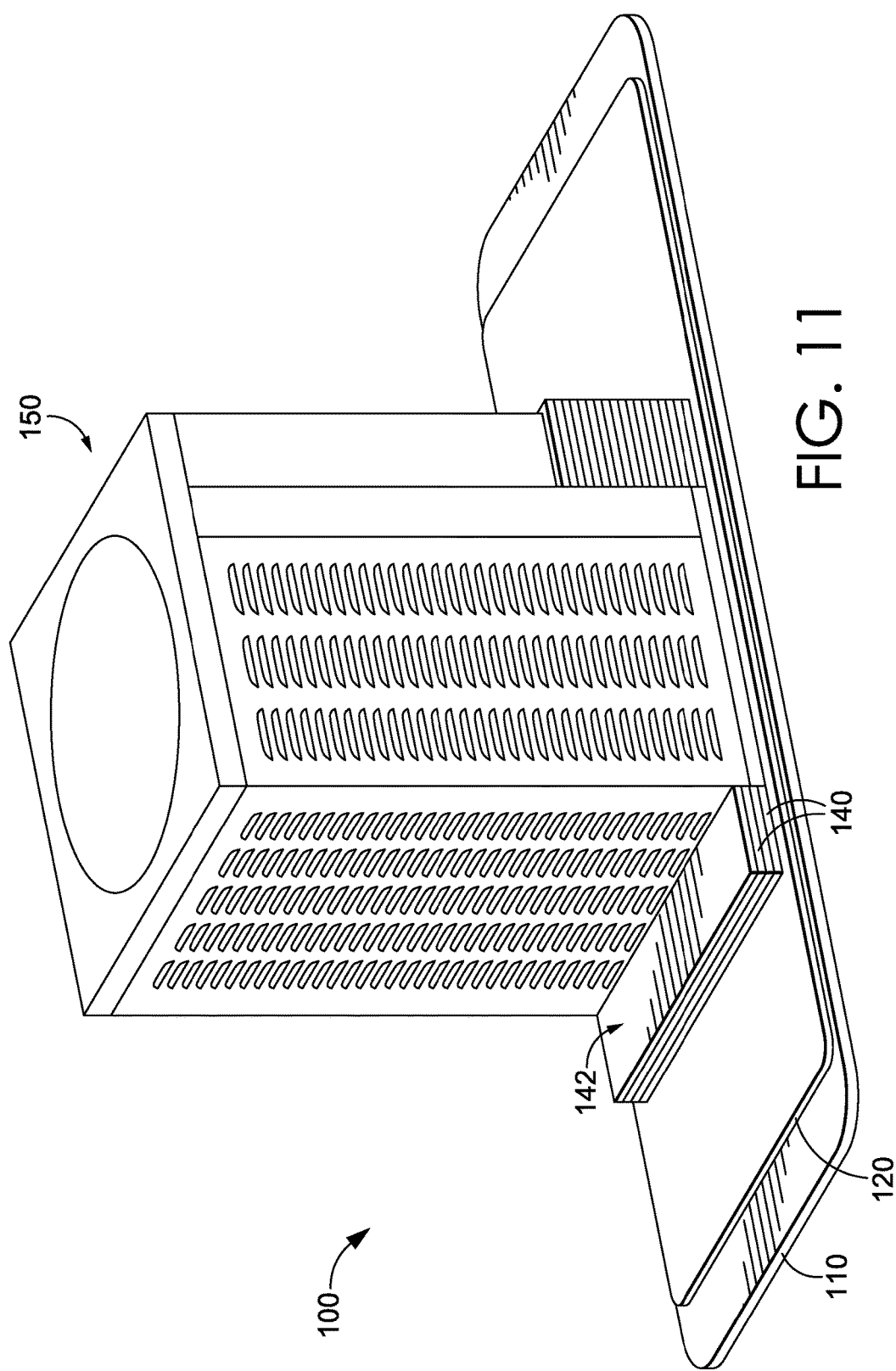
FIG. 11 depicts a perspective view of an exemplary sled with an item in transport position, with an exemplary configuration of the adaptable load-stabilizing elements, in accordance with aspects hereof.

As can be appreciated, the various embodiments provided herein may be used to transport any number of items. For example, FIG. 11 depicts a central air-conditioning unit 150 loaded on a sled 100 with the adaptable load-stabilizing elements 140 configured to support the central air-conditioning unit during transport. However, the exemplary configurations and uses depicted in the figures are not intended to be limiting. Rather, it is contemplated herein that the various embodiments provided in this disclosure may be adaptable to provide a suitable transport surface for virtually any item or load.

Figure 12:
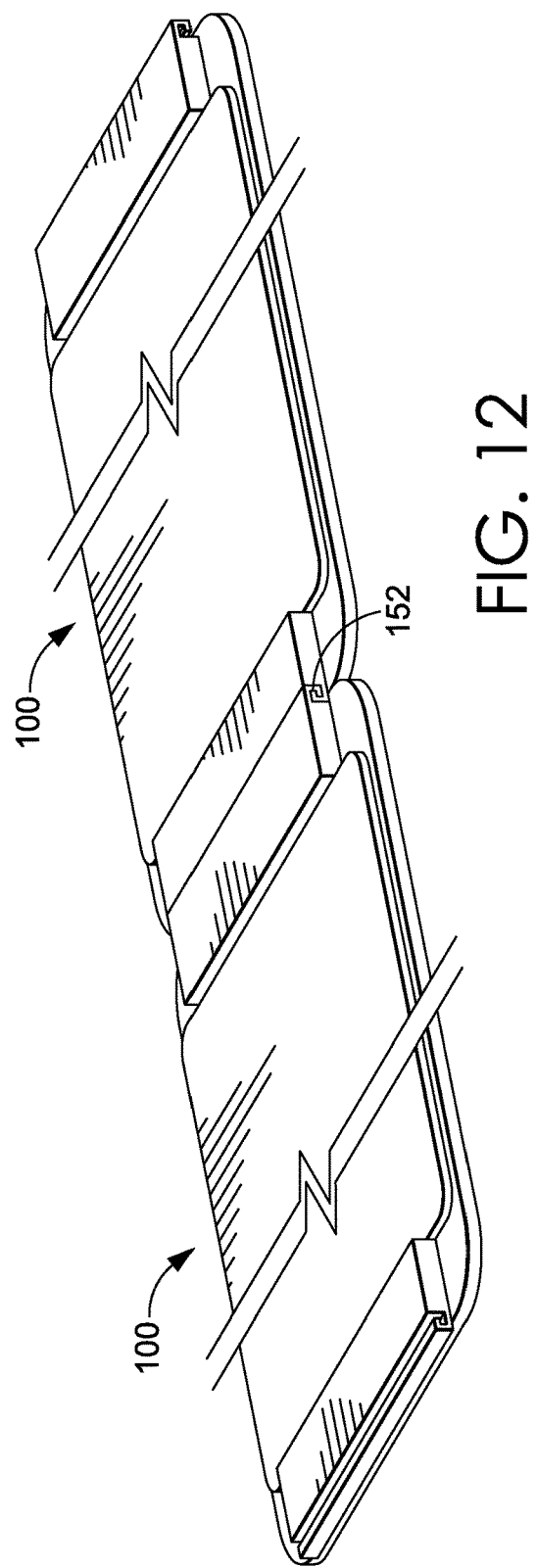
FIG. 12 depicts a perspective view of an exemplary configuration of two sleds coupled by exemplary jointed load-stabilizing elements to form an adaptable load-engaging surface, in accordance with aspects herein.

In another exemplary embodiment, as shown in FIG. 12, a sled 100 may be configured to be coupled with another sled. Accordingly, two or more sleds 100 may be coupled with one another to provide a load-engaging surface that is adapted for a desired use. For example, the two sleds 100 may be coupled with one another to provide a load-engaging surface for transporting a swimming pool (such as a fiberglass swimming pool). Additionally, in such a configuration the adaptable load-stabilizing elements may be positioned at the joint between the two sleds 100 to provide a substantially flat surface for transporting an item. Further, although depicted here as being coupled longitudinally (end to end), it should be appreciated that multiple sleds 100 may also be coupled laterally (side to side). Additionally, the sleds 100 may be coupled using any suitable means, such as strapping, via a joint 152 (e.g., dovetail or lap joints, among others) manufactured or machined into the sleds 100, or any other suitable fastening mechanism.

Aspects hereof may be described using directional terminology. For example, the terms "horizontal" and "horizontally" as used herein refer to direction and describe an orientation generally parallel to the surface of the earth. Accordingly, the terms "vertical" and "vertically" as used herein refer to a direction perpendicular to, or more perpendicular than parallel to, horizontal. Additionally, relative location terminology will be utilized herein. For example, the term "proximate" is intended to mean on, about, near, by, next to, at, and the like. Therefore, when a feature is proximate another feature, it is close in proximity but not necessarily exactly at the described location, in some aspects. Further, terminology relating to relative positions of various features of the aspects of this disclosure is also used herein.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

What is claimed:

1. A load moving and stabilizing apparatus, the apparatus comprising:
    a base element having a generally rectangular and planar shape;
    a primary load-engaging surface that is affixed to a top surface of the base element, a top portion of the primary load-engaging surface comprising a first wave-shaped surface; and
    one or more adaptable load-stabilizing elements adjustably coupled to a top portion of the primary load-engaging surface, the one or more adaptable load-stabilizing elements comprising a second wave-shaped surface, the first-wave shaped surface configured to receive the second wave-shaped surface, wherein the primary load-engaging surface is coupled to the one or more load-stabilizing elements by placing the first wave-shaped surface and the second wave-shaped surface in contact with one another.

2. The apparatus of claim 1, wherein the one or more adaptable load-stabilizing elements are configured for adjustable coupling with one another, such that the one or more adaptable load-stabilizing elements are stackable.

3. The apparatus of claim 1, wherein the one or more load-stabilizing elements are configurable, such that the one or more load-stabilizing elements form a secondary load-engaging surface that provides a substantially level engagement with a load.

4. The apparatus of claim 1, wherein the primary load-engaging surface comprises one or more fastening mechanisms configured to mate with one or more complementary fastening mechanisms of the one or more adaptable load-stabilizing elements.

5. The apparatus of claim 1, wherein the base element is formed from a high density polymer and has a smooth ground-engaging surface.

6. The apparatus of claim 1, wherein the primary load-engaging surface and the one or more adaptable load-stabilizing elements comprise a compressible material, such that the primary load-engaging surface and the one or more adaptable load-stabilizing elements conform to the contours of a load.

7. The apparatus of claim 1, wherein the primary load-engaging surface and the one or more adaptable load-stabilizing elements are formed from one or more of polyethylene foam and cell sponge rubber.

8. A sled for moving and stabilizing loads, the sled having a primary load-engaging surface and a secondary load-engaging surface, the sled comprising:
- a base element having a generally planar shape;
- a primary load-engaging surface that is affixed to a top surface of the base element; and
- a secondary load-engaging surface comprising one or more adaptable load-stabilizing elements adjustably coupled to the primary load-engaging surface, the one or more adaptable load-stabilizing elements at least partially constructed of a cohesive material, the cohesive material providing an adhesive force to detachably couple a first load-stabilizing element to at least one of the primary load-engaging surface and a second adaptable load-stabilizing element.

9. The sled of claim 8, wherein the one or more adaptable load-stabilizing elements are configured for adjustable coupling with one another such that the one or more adaptable load-stabilizing elements are stackable.

10. The sled of claim 8, wherein the secondary load-engaging surface is configurable, such that the secondary load-engaging surface provides a substantially level engagement with a load.

11. The sled of claim 8, wherein the primary load-engaging surface comprises one or more fastening mechanisms configured to mate with one or more complementary fastening mechanisms of the one or more adaptable load-stabilizing elements.

12. A sled for moving and securing objects, the sled comprising:
- a base element having a generally planar shape;
- a primary load-engaging surface that is affixed to a top surface of the base element, the primary load-engaging surface comprising a first surface; and
- at least one adjustable load-securing element coupled to the primary load-engaging surface, each of the at least one adjustable load-securing elements comprising a first surface and a second surface opposite the first surface, the first surface of the primary-load engaging surface and at least one of each load-securing element's first surface and second surface comprising a surface treatment, the surface treatment creating frictional resistance to a lateral force applied between the primary load-engaging surface and the at least one load-securing element.

13. The sled of claim 12, further comprising one or more adaptable load-stabilizing elements adjustably coupled to the primary load-engaging surface.

14. The sled of claim 13, wherein the primary load-engaging surface, the at least one adjustable load-securing element, and the one or more adaptable load-stabilizing elements are formed from an adaptable material, such that the primary load-engaging surface and the at least one adjustable load-securing element conform to the contours of a load.

15. The sled of claim 13, wherein the one or more adaptable load-stabilizing elements are sized to fit within a void formed within the at least one adjustable load-securing element.

16. The sled of claim 12, wherein the primary load-engaging surface comprises one or more fastening mechanisms configured to mate with one or more complementary fastening mechanisms of the at least one adjustable load-securing element.

17. The sled of claim 12, further comprising a second adjustable load-securing element.

* * * * *